2,772,267

PRECIPITATION OF HYDROLYZED CELLULOSE ACETATE

Carl J. Malm and Carlton L. Crane, Rochester, N. Y., assignors to Eastman Kodak Company, Rochester, N. Y., a corporation of New Jersey No Drawing. Application October 24, 1952, Serial No. 316,792

1 Claim. (Cl. 260—230)

This invention relates to a method of precipitating hydrolyzed cellulose acetate from its solution which results from its manufacture characterized by the employment of sulfate salts in the precipitation liquid.

In the manufacture of hydrolyzed cellulose acetate the economy of the process depends to a considerable extent upon the concentration of the acetic acid which results when the cellulose acetate is precipitated. In the precipitation of cellulose acetates having an acetyl content of 32% the concentration of acetic acid previously has had to be reduced to as low as 10% acetic acid in order to obtain precipitation of the cellulose ester therein. In the case of cellulose acetate having a higher acetyl content such as 37–38% reducing the concentration of acetic acid to a value on the order of 25% will cause precipitation of the cellulose acetate. In the case of cellulose acetates having an acetyl content of 27–36% acetyl or less precipitation is usually difficult to accomplish a large proportion of water is necessary and excessive foaming is encountered. Also in the case of those esters there is difficulty in obtaining the precipitate in a good physical form as that material is often obtained in a soft and gummy condition and difficulties are encountered in removing the acid therefrom.

One object of our invention is to provide a method for precipitating hydrolyzed cellulose acetates in which the concentration of acetic acid need not be reduced to the extent formerly considered necessary. Another object of our invention is to provide a method for precipitating hydrolyzed cellulose acetates generally in good physical form. A further object of our invention is to provide a method for precipitating cellulose acetates in which an alkali metal or magnesium sulfate is employed therein. Other objects of our invention will appear herein.

We have found that in precipitating hydrolyzed cellulose acetates having an acetyl content of 27–40% from the solutions which result from the hydrolysis step in their manufacture that the precipitation occurs under much higher concentration conditions if alkali metal or magnesium sulfate is present in the precipitation liquid and that the precipitate which is obtained by such a method exhibits good physical form. As an example of precipitating cellulose acetate having an acetyl content on the order of 32% we have found that under optimum conditions in accordance with our invention precipitation may be accomplished in aqueous acetic acid having a 25% concentration whereas formerly a concentration on the order of 10% has been necessary for this purpose. We have also found that cellulose acetates having an acetyl content of 37–38% may be precipitated in aqueous acetic acid having a concentration as much as 40% whereas heretofore it has been necessary to reduce the concentration of the acetic acid to a value on the order of 25% for precipitation to occur. We have found that the precipitation of cellulose acetates at these increased concentrations is made possible by the addition of a small proportion of an alkali metal or magnesium sulfate to the precipitating liquid which is used. We have also found that the amount of magnesium sulfate or alkali metal sulfate which will be effective may be in the range of 1–20% of the acetic acid present in the precipitation step.

We have found that our method of precipitation is of particular value in precipitating cellulose acetates having an acetyl content within the range 19–36% as thereby the excessive foaming formerly encountered in precipitating those esters is eliminated and the cellulose acetate is obtained in the form of granules having good size uniformity.

The precipitation of cellulose acetate from the bath in which the cellulose acetate is in solution may be either by a direct precipitation, that is, by slowly adding the cellulose acetate mass to the precipitation liquid while rapidly stirring or it may be carried out by a reverse precipitation characterized by the addition of the precipitation liquid to the cellulose acetate mass while vigorously stirring. In either case the presence of the aforementioned salts is desirable to obtain precipitation at concentrations of acetic acid of much greater degree than those in which the precipitation of cellulose acetate has been carried out.

In the manufacture of cellulose acetate, cellulose of good grade such as refined cotton linters or high alpha cellulose content wood pulp is preliminarily treated with an esterification bath after activating the cellulose. This esterification bath ordinarily comprises acetic anhydride, acetic acid and sulfuric acid catalyst. After the cellulose acetate has been esterified the cellulose acetate is more often than not hydrolyzed by adding to the mass water (usually in the form of aqueous acetic acid) and the mass is allowed to set preferably at an elevated temperature such as above 100° F. until the desired acetyl content is obtained. In the case of cellulose acetates in the upper part of the range given herein 38–40% acetyl, the mass is allowed to stand until that acetyl content is obtained. However, in those cases where the acetyl content is to be lowered somewhat further it is a satisfactory practice to render the acetic acid more aqueous after the cellulose acetate has been hydrolyzed to some extent as described for instance, in U. S. Patents Nos. 2,013,830 of Malm and Fletcher and 2,129,052 of Fordyce. When the desired acetyl content is obtained the cellulose acetate should be separated from the liquid portion of the mass. This is accomplished in accordance with our invention by mixing with the mass aqueous acetic acid to reduce the acetic acid concentration to the desired point plus incorporation in the precipitating liquid of magnesium or alkali metal sulfate. This acetic acid concentration depends among other factors on the acetyl content, on the cellulose acetate being precipitated and up to a point on the salt content of the precipitation liquid which is used. The amount of magnesium sulfate or alkali metal sulfate which may be employed in accordance with our invention is any proportion from 1 to 20% based on the weight of the acetic acid present in the precipitation step. In order to get the maximum effect of the salt and the precipitation liquid it is desirable to use an amount of salt on the order of 10%. In the range of 1–10% the effectiveness of the salt content increases while beyond the 10% point the effectiveness remains substantially the same. For instance, if the ester to be precipitated is a cellulose acetate having an acetyl content of 29% the ester will precipitate when the concentration of acetic acid is as great as 25% whereas without the salt content in the precipitating liquid it is necessary to reduce the concentration of acetic acid to a percentage on the order of 10%. When only 1% of salt is present on the other hand the precipitation will only begin in acetic acid less than 25% strength but above the 10% value. In the case of cellulose acetate having an acetyl content in the range of 36–40% precipitation is obtained when the concentration of acetic acid is reduced to a value on the order of 40%, when an amount of salt on the order of 10% is present in the precipitation liquid as contrasted to the necessity of reducing the concentration to 25% acetic acid to obtain precipitation without the benefit of the salt. Here again the presence of lower amounts of salt than 10% are also effective in causing precipitation at concentrations higher than that which will precipitate the cellulose acetate without the benefit of salt.

One of the objects of our invention is to make possible the obtaining of a much more concentrated acetic acid than formerly in the precipitation of hydrolyzed cellulose acetates. In order to reclaim the acetic acid thus obtained the water must be substantially eliminated therefrom. This is ordinarily accomplished by first subjecting the aqueous acetic acid to an extraction process with an organic solvent whereby the acetic acid is concentrated to some extent followed by subjecting the organic solvent solution of the acetic acid to a distillation procedure thus separating the acetic acid from the organic solvent and remaining water. It is an advantage in the use of the sulfates as the salts for this purpose that the salts exhibit a certain degree of insolubility in the organic solvent and remain in the water layer and therefore, separation of the sulfate may be obtained from the acetic acid in the concentration of that acid before the distillation procedure is carried out. The water containing the sulfates can then be used in the precipitation of subsequent batches.

We have found that by the precipitation method in which the alkali metal or magnesium sulfate are used precipitates are obtained in a good physical form such that they may be readily dissolved in solvents. In one form of the precipitation the cellulose acetate hydrolysis mass is introduced in a steady stream into agitated precipitation liquid consisting of aqueous acetic acid containing magnesium or alkali metal sulfate in the concentrations indicated. In another form of precipitation, in accordance with our invention, the precipitation liquid is introduced into the cellulose acetate hydrolysis mass accompanied by agitation; here again the precipitation liquid being aqueous acetic acid containing magnesium or alkali metal sulfates in the concentrations indicated. The amount of aqueous acetic acid mixed with the hydrolysis mass is sufficient to reduce the acetic acid concentration of the mixture to that point at which precipitation of the cellulose acetate occurs. The precipitation liquid may be conveniently an aqueous acetic acid of 5–10% concentration although variation is permitted in accordance with the desires of the individual operator and the most satisfactory conditions of operation for the particular ester which is being precipitated.

The product obtained in the precipitation of cellulose acetate in accordance with our invention is obtained in the form of small granules which when thoroughly washed and dried are readily flowable. However, this precipitated mass of cellulose acetate is free of dust so that the same can be readily handled without the inconveniences which are experienced with dry masses of this kind having non-uniformity of particle size.

The following examples illustrate our invention.

*Example 1*

7.3 parts of refined acetylation grade cotton linters having a moisture content of 0.3 part were mixed together with 28 parts of acetic acid in a sigma blade type mixer and the mixture was run for 30 minutes at 100° F. 15 parts of acetic acid was then added to the mixing mass and the temperature was reduced to 90° F. Thereupon a mixture consisting of 0.0694 part of 96% concentration sulfuric acid and 0.66 part of acetic acid was added to the mixer and the temperature thereof was then reduced to 66° F. There was then added to the mixer 19.6 parts of 97% acetic anhydride and the temperature of the mass in the mixer was reduced to 50° F. There was then added a mixture consisting of 0.45 part of 96% sulfuric acid and 0.66 part of acetic acid and the temperature of the mass in the mixer was allowed to rise to 87° F. over a period of 1½ hours. The mixer blades were run during the entire proceedings.

At the end of the 1½ hours there was then added to the mass 21 parts of 66.6% concentration acetic acid having a temperature of 150° F. which addition to the mass in the mixer took place over a period of 1 hour during which time the temperature of that mass was allowed to rise to 145° F. The cellulose acetate which had formed in the mass was hydrolysed by allowing the mass to stand at 110° F. for 30 hours. There was then added 23.3 parts of distilled water over a period of 1 hour and the hydrolysis was continued until a sample of the cellulose acetate when precipitated, washed and dried showed an acetyl content of 29.9%.

0.38 part of $MgCO_3$ was then added to the mass and 27.5 parts thereof was placed in a turbo type mixer and the temperature was adjusted to 70° F. The solution was stirred and during the stirring 48.5 parts of distilled water containing 2.5 parts of sodium sulfate were added to the mixer over a period of 20 minutes. The cellulose acetate in solution in the mass precipitated and when the precipitation was complete the precipitate was drained, washed free from uncombined acids with water and dried. A granular dust-free product was obtained which product analyzed as follows:

| | |
|---|---|
| Acetyl _____ percent__ | 29.9 |
| Melting point _____ °C__ | 230 |
| Char point _____ °C__ | 295 |
| Ash content _____ percent__ | 0.02 |
| Acid in the precipitation bath_____ do____ | 25 |

*Example 2*

7.3 parts of acetylation grade cotton linters having a moisture content of 0.3 part was mixed with 28 parts of acetic acid in a Werner-Pfleiderer mixer and the mixer was run for 30 minutes at 100° F. 15 parts of acetic acid was added to the mixer. The temperature was reduced to 90° F. and then a mixture of 0.0694 part of 96% sulfuric acid and 0.66 part of acetic acid was added to the mixer and the temperature was reduced to 66° F.

There was then added to the mass in the mixer 19.6 parts of 97% acetic anhydride and the temperature was reduced to 50° F. Thereupon a mixture of 0.45 part of 96% sulfuric acid and 0.66 part of acetic acid was added to the mixer and the temperature was allowed to rise to 87° F. over 1½ hours.

At the end of the 1½ hours there was added to the mixer 0.316 part of $MgCO_3$ and then 21 parts of 66% acetic acid over a period of 1½ hours during which time the temperature was allowed to rise to 170° F. The temperature of the mass was then reduced to 150° F. and held for 30 hours to hydrolyze the cellulose acetate which had been prepared. There was then added 23.3 parts of distilled water having a temperature of 150° F. to the mass in the mixer over a period of 1 hour and hydrolysis was continued until a small sample of the cellulose acetate when precipitated and purified analyzed 29.9% acetyl; 0.106 part of $MgCO_3$ were added to the bath and the temperature was reduced to 70° F. 10 parts of this mass was placed in a turbo type mixer and a mixture of 24.4 parts of water and 0.914 part of sodium sulfate was added thereto over a period of 20 minutes while stirring the mass. A precipitate was formed which precipitate was drained and washed free from uncombined acids with water and dried. A fine white dust-free cellulose acetate was obtained having an acetyl content of 29.5%.

Example 3

7.3 parts of acetylation grade cotton linters containing 0.3 part of moisture were mixed with 28 parts of acetic acid in a Werner-Pfleiderer type mixer. The mixer was run 30 minutes at 100° F. 15 parts of acetic acid was added to the mixer and the temperature was reduced to 90° F. A mixture of 0.0694 part of 96% sulfuric acid and 0.66 part of acetic acid was added to the mixer and the temperature was reduced to 66° F. There was then added 19.6 parts of 97% acetic anhydride. The temperature was reduced to 50° F. and a mixture of 0.45 part of 96% sulfuric acid and 0.66 part of acetic acid was added to the mixer. The temperature of the mass was allowed to rise to 87° F. over a period of 1½ hours during which time the cellulose dissolved in the reaction mass forming cellulose acetate.

0.316 part of $MgCO_3$ was added followed by the addition of 21 parts of 66% acetic acid over a period of 1½ hours. During this period the temperature was allowed to rise to 170° F. The temperature of the bath was reduced to 150° F. and held for 30 hours, hydrolyzing the cellulose acetate in the bath. 23.3 parts of 150° F. distilled water were then added to the mixer over a period of 1 hour and then hydrolysis was continued until a sample when precipitated and purified analyzed 29.9% acetyl. 0.106 part of $MgCO_3$ were added to the bath and the temperature was reduced to 70° F. 10 parts of this bath were placed in a turbo type mixer and a mixture of 24.4 parts of water and 1.87 parts of $MgSO_4.7H_2O$ were added to the mixer over a period of 20 minutes whereupon a precipitate of cellulose acetate was obtained. The product thus obtained was drained, washed free from uncombined acids with water and dried. A fine, white dust-free product was obtained having an acetyl content of 29.5%.

Example 4

7.1 parts of acetylation grade wood pulp containing 0.1 part of moisture was mixed with 31.7 parts of acetic acid and 3.5 parts of propionic acid in a Werner-Pfleiderer type mixer the mixture being stirred at 110° F. for ¼ hour after which it was cooled to 95° F. There was then added to the mixer a mixture of 0.198 parts of sulfuric acid and 0.062 part of acetic acid. The mass was then cooled to 75° F.

17.9 parts of 97% acetic anhydride were added. The mass was cooled to 66° F. and then a mixture of 0.19 part of 96% sulfuric acid and 0.068 part of acetic acid were added to the mixer and the temperature was allowed to rise to 112° F. over 2 hours during which time the cellulose dissolved forming cellulose acetate. 27.3 parts of 64% acetic acid containing 0.162 part of $MgCO_3$ were stirred into the esterification bath during which time the temperature rose to 120° F. The temperature was then raised to 140° F. and the mass was allowed to stand at this temperature until a sample taken therefrom analyzed 38% acetyl.

0.179 part of $MgCO_3$ was added to the bath and the temperature was reduced to 70° F. 24 parts of this bath were placed in a turbo mixer and a mixture consisting of 26.2 parts of water and 2.09 parts of sodium sulfate was added to the mixer over a period of 20 minutes. The cellulose acetate therein was precipitated and the product thus obtained was drained, washed free from uncombined acids with water and dried. The fine, white product thus obtained was found to have an apparent acetyl content of 38%, an ash content of 0.034%, a melting point of 232° C. and a char point of 300° C.

Example 5

27.5 parts of the neutralized solution prepared as described in Example 1 were added to a turbo type mixer in which was being agitated a mixture of 48.5 parts of distilled water containing 2.25 parts of sodium sulfate. A precipitate of cellulose acetate was obtained in flake form. This precipitate was drained, washed free from uncombined acids with water and dried. The product obtained was found to have an apparent acetyl content of 29.5%.

We claim:

A method of precipitating hydrolyzed cellulose acetate having an acetyl content of 27–40% from the solution in which it was prepared, which comprises mixing said solution with water containing on the order of 10%, based on the acetic acid in the precipitation liquid, of magnesium sulfate.

References Cited in the file of this patent

UNITED STATES PATENTS

| | | |
|---|---|---|
| 2,214,943 | Tinsley | Sept. 17, 1940 |
| 2,543,191 | Neilson et al. | Feb. 27, 1951 |

FOREIGN PATENTS

| | | |
|---|---|---|
| 574,106 | Great Britain | Dec. 20, 1945 |